US005374476A

United States Patent [19]
Horsley

[11] Patent Number: 5,374,476
[45] Date of Patent: Dec. 20, 1994

[54] THERMAL INSULATING SYSTEM AND METHOD

[75] Inventor: William J. Horsley, Boulder, Colo.

[73] Assignee: Ball Corporation, Muncie, Ind.

[21] Appl. No.: 605,060

[22] Filed: Oct. 22, 1990

[51] Int. Cl.$^5$ .............................. B32B 3/26; C01B 3/02
[52] U.S. Cl. ................................. 428/305.5; 264/45.1; 264/46.4; 264/48; 423/649; 428/317.9; 428/321.1
[58] Field of Search ............... 428/305.5, 317.9, 304.4, 428/321.1; 423/649, 648.1; 264/45.1, 46.4, 48

[56] References Cited

U.S. PATENT DOCUMENTS

| | | | |
|---|---|---|---|
| 3,043,110 | 7/1962 | Ahern | 423/649 |
| 3,116,115 | 12/1963 | Kasparian et al. | 423/649 |
| 3,291,333 | 12/1966 | House | 428/63 |
| 3,682,100 | 8/1972 | Lindberg, Jr. | 244/163 |
| 3,714,047 | 1/1973 | Marion et al. | 252/62 |
| 3,883,096 | 5/1975 | Osofsky | 244/117 A |
| 4,107,376 | 8/1978 | Ishikawa et al. | 428/305.5 |
| 4,259,401 | 3/1981 | Chahroudi et al. | 428/305.5 |
| 4,331,731 | 5/1982 | Seike et al. | 428/305.5 |
| 4,367,788 | 1/1983 | Cordon | 165/53 |
| 4,393,039 | 7/1983 | Sherman | 423/649 |
| 4,572,864 | 2/1986 | Benson et al. | 428/305.5 |

OTHER PUBLICATIONS

T. Morita, et al., "Liquid Hydrogen Storage Tank Equipped with Para-Ortho Conversion Device", Sep. 1987, *Chemical Abstracts*, vol. 107 (p. 154), Abstract No. 80462t.

T. C. Nast, et al., "Development of a Para-Orthohydrogen Catalytic Converter for a Solid Hydrogen Cooler", *Advanced Cryogenic Engineering*, 1984, vol. 29, pp. 723–731.

*Primary Examiner*—Jenna L. Davis
*Attorney, Agent, or Firm*—Gilbert E. Alberding

[57] ABSTRACT

A passive insulating system can provide highly effective protection in the presence of transient high temperatures. The system comprises, for example, a porous body forming a multiplicity of fine cells with a material having low thermal conductivity, a thermally absorptive liquid, providing an endothermic reaction in the presence of a catalyst, and a finely divided catalyst for the reaction uniformly distributed in the porous body. In preferred systems, the thermally absorptive liquid is para-hydrogen, the catalyst is granulated ferric oxide, and the liquid para-hydrogen changes to gaseous para-hydrogen, and from para-hydrogen to ortho-hydrogen in the presence of the ferric oxide catalyst, absorbing heat by its heat of vaporization and endothermic catalytic reaction and reducing heat transfer through the porous body.

12 Claims, 1 Drawing Sheet

THERMAL INSULATING SYSTEM AND METHOD

FIELD OF THE INVENTION

This invention relates to a system and method for reducing the transfer of heat to a body, and particularly relates to system and method for providing effective thermal insulation of a body from a transient heat source at high temperature.

BACKGROUND OF THE INVENTION

Thermal insulating systems have been the subject of extensive developmental efforts, particularly insulating systems for aerospace application. Such systems include the use of high temperature thermal insulation such as that sold by Manville under their trademark Min-K. Min-K thermal insulation is available in a fabric formed from fibrous media and very fine heat-resistant particulate matter and creates a physically strong, microporous insulation with extremely low thermal conductivity (e.g., 0.20–0.26 BTU/in/FT$^2$-Hr-F°) and low thermal diffusivity that is effective at high temperature and high altitudes.

At the other temperature extreme are the thermal insulative systems commonly used in vacuum-insulated cryogenic dewars and sometimes referred to as "super insulation" or "SI". Such systems can comprise multiple layers of a metallized film, such as metallized mylar, which has been provided with a distribution of protrusions to prevent face-to-face contact when the film is wrapped around the inner container of a vacuum insulated dewar, provided with a distribution of openings to permit evacuation of the intervening space between the inner dewar and outer shield of a vacuum insulated dewar, and provided with a metallized surface to reduce heat transfer by radiation between the inner container and outer shield of a vacuum-insulated dewar.

Static systems for providing thermal insulation at normal atmospheric conditions commonly include the use of foam-like insulation formed from catalyzed liquid including blowing agents that are released by reaction in response to the catalyst to form cellular solids with a fine cell structure. Such insulating systems include polyurethane and isocyanate foam systems, and styrene-based foam systems such as those sold by Dow Chemical Co. under their trademark STYROFOAM.

Other systems have also been suggested for normal atmospheric conditions. For example, U.S. Pat. No. 4,367,788 discloses the use of a porous material, such as perlite, mixed with a suitable phase-change compound, such as sodium sulfate decahydrate (Glauber's salt), having a high latent heat of fusion at near room temperature. When the system of U.S. Pat. No. 4,367,788 is used to insulate a building, heat that penetrates the insulation system is stored in the phase-change material by its conversion from solid phase to liquid phase, and the heat is then released when the temperature falls as the phase-change material converts from liquid to solid phase, thus reducing the heat transferred between the exterior to the interior of the building through the action of the phase-change material and its latent heat of fusion.

Cryogenic cooling systems for space-based sensors have also been the subject of development. For example, U.S. Pat. No. 4,671,080 discloses a closed cryogenic cooling system using an electrochemical pump to provide a pressurized gas stream of hydrogen (or oxygen) in a high pressure flow to one or more heat exchangers to cool the hydrogen gas stream below its inversion temperature, followed by an expansion through a Joule-Thomson flow restrictor into a load heat exchanger to provide cryogenic cooling for the load. In space craft applications, it is disclosed that the Joule-Thomson flow restrictor can be a metal, foam or porous sinter and that the conversion of hydrogen between its para and ortho states should be considered in the design of such systems with the incorporation of suitable catalysts in the high pressure and low pressure sides of a regenerative heat exchanger between the Joule-Thomson valve and the electrochemical pump.

U.S. Pat. No. 4,393,039 discloses the use of the vapor from a solid hydrogen mass (maintained below its triple point by a cryogenic dewar) and the endothermic catalytic conversion of the hydrogen vapor from its para state to ortho state in cooling a load.

Notwithstanding such development, a need remains for lightweight, passive systems to provide effective thermal insulation and protection of the mechanical and electrical systems and structures of flight vehicles, particularly those flight vehicles exposed to extraordinary conditions of atmosphere and temperature, such as the X-30 hypersonic aircraft and other such space flight vehicles.

DISCLOSURE OF THE INVENTION

This invention provides a passive system for the effective thermal insulation of system elements and objects exposed to extraordinary temperatures, and a preferred passive system providing highly effective protection against transient high temperatures through a change of state and an endothermic catalytic conversion of para-hydrogen to ortho-hydrogen at a controlled rate in response to heat transfer from the high temperature through a porous, thermally insulated cellular structure.

A thermal insulating system of this invention provides between a body, element or system to be protected, and a source of extraordinary temperature, means forming a porous body having a multiplicity of fine cells carrying a thermally absorptive liquid having a boiling point less than the extraordinary temperature. Preferably, the thermally absorptive liquid provides an endothermic reaction in the presence of a catalyst, and the catalyst for the reaction is uniformly distributed throughout the porous body forming the multiplicity of fine cells so that in response to heat entering the system from the source of high temperature, the thermally absorptive liquid changes to a vapor state and undergoes an endothermic reaction upon exposure to the distributed catalyst as it travels through the porous body.

The preferred system uses liquid para-hydrogen as the thermally absorptive liquid. The liquid para-hydrogen is carried in the multiplicity of fine closed cells formed by a porous silicious high temperature insulating foam including a uniform distribution of finely divided, particulate ferric oxide catalyst for conversion of the para-hydrogen to ortho-hydrogen.

In the invention, the transfer of heat to the body, element or system being protected is reduced by forming a porous enclosure for the body including a multiplicity of fine cells from, for example, a porous solid foam-like material which carries a uniform distribution of finely divided granulated catalyst for para to ortho-hydrogen conversion. The porous enclosure is immersed into a bath of liquid para-hydrogen to fill a multiplicity of fine cells of the porous enclosure with liquid para-hydrogen. When the body, element or system to be protected is thereafter enclosed by the porous enclosure, the body, element or system is protected from heat entering the porous enclosure by the conversion of liquid para-hydrogen from its liquid to gaseous state and to ortho-hydrogen under the influence of the particulate catalyst, thereby absorbing heat and reducing the transfer of heat to the body, element or system being protected.

In the invention, the porous enclosure can be formed by providing a mold to form the porous enclosure, providing a foam-forming liquid, mixing the finely divided solid catalyst into the foam-forming liquid to provide a uniform mixture of catalyst suspended in the foam-forming liquid, adding a catalyst for the foam-forming reaction to the uniform mixture of foam-forming liquid and catalyst particles; pouring the catalyzed uniform mixture of foam-forming liquid and catalyst particles into the mold; and allowing the uniform mixture of foam-forming liquid and catalyst particles to form a solid but porous foam structure including a uniform distribution of catalyst particles in a shape to surround the body.

Further features and advantages of the invention will be apparent from the drawings and descriptions of the best mode of the invention that follow.

DESCRIPTION OF THE BEST MODE OF THE INVENTION

In the invention, an apparatus, body or element 10 to be insulated is encompassed by a thermal insulating system 11. Such apparatus, bodies or elements may be electronic assemblies, pumps, motors and other such elements. Such elements may be provided with an encompassing system of the invention 11 by a number of methods depending upon the nature of the apparatus, body or element to be protected. For example, electronic assemblies that may be contained within sealed containers may be molded within an encompassing system 11 of the invention, while other apparatus, bodies and elements may be provided with the system of the invention through premolded, encompassing insulating systems that may be formed in more than one piece to provide an interior cavity for the apparatus, body or element to be insulated and provide a surrounding insulating system of the invention.

Figure 1:
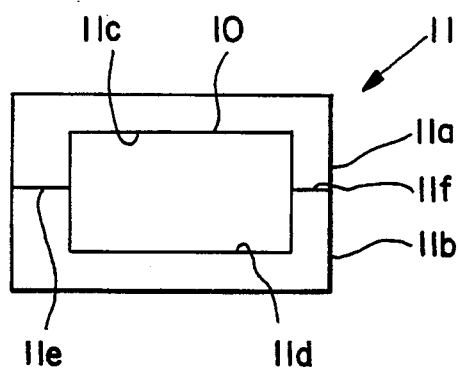
FIG. 1 is a cross-section of an element to be insulated and an insulating system of the invention.

For example, as shown in FIG. 1, the insulation system 11 is comprised of two premolded portions 11a and 11b, each of which is provided with an internal cavity 11c and 11d, respectively, which are formed to encompass the apparatus, body or element 10 to be protected. The premolded portions 11a and 11b are fitted over the apparatus, body or element 10 and meet at the respective interfaces 11e and 11f. FIG. 1 is a simplified cross-sectional drawing to illustrate one of the many forms that might be taken by the invention by showing a rectangular box 10 that may, for example, be an electronics module encompassed by a pair of complementary, premolded, insulating system portions 11a and 11b. The interior structure of the insulating system 11 of FIG. 1 is not shown in FIG. 1 because of the small scale of FIG. 1. The invention is also illustrated and shown in the larger scale drawings of FIGS. 2 and 3.

Figure 2:
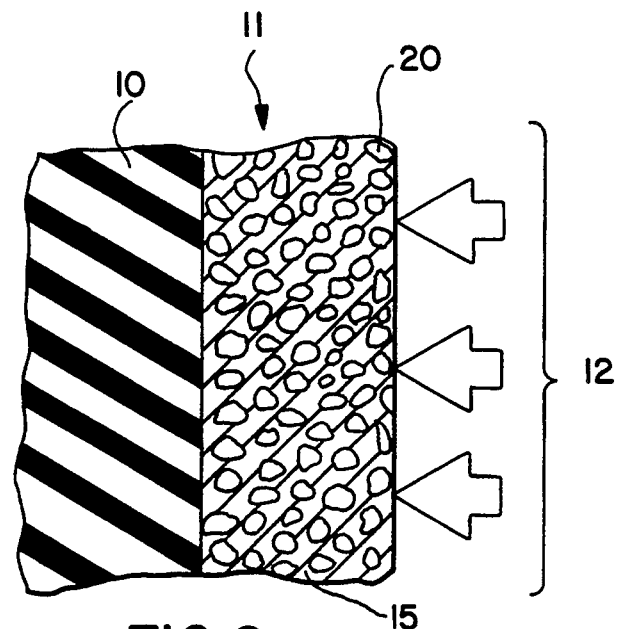
FIG. 2 is an enlarged cross-section of a portion of FIG. 1 to illustrate the multicellular structure of the system of the invention.

FIG. 2 is an enlarged cross-sectional portion of a system of the invention showing a portion of the apparatus, body or element 10 which is insulated by the system of the invention 11 from exterior heat, which is indicated by the plurality of arrows 12. In the operation, for example, of hypersonic vehicles such as the X-30 aircraft, it is not uncommon that the environment of the aircraft will be exposed for short periods to temperatures as high as 1100° F. (693° C.) for periods of one to two hours. Such high temperatures are sufficient to destroy or seriously impair the operation of many kinds of apparatus and many elements needed in the operation of such hypersonic aircraft. With the thermally insulating system of the invention, a porous cellular insulating body 11 is provided between the high temperature environment 12 and the apparatus, body or element 10 to protect the apparatus, body or element 10 and prevent it from reaching destructively high temperatures.

The porous cellular insulating body 11 is comprised of a suitable foam-forming substance such as that described in prior U.S. Pat. Nos. 2,808,338, 3,055,831 and 3,950,259, such foam-forming materials are available from Manville under their trademark MIN-K2000. The multi-cellular structure formed by such foam-forming materials have fine cells providing voids within the structure equal to approximately 88% of the structure volume. In addition to the poor thermal conductivity provided by the voids, the foam-forming structural material itself has poor thermal conductivity less than about 0.5 BTU/in/FT$^2$-Hr-F°.

In accordance with the invention, the porous cellular insulating body 11 includes a uniform distribution of finely divided para-to-ortho-hydrogen catalyst in the cell-forming structure, and liquid para-hydrogen is provided in the cells of the multicellular structure. As heat from the surrounding environment 12 enters the porous cellular insulating body 11, it converts the liquid para-hydrogen to gaseous para-hydrogen which passes outwardly through the porous cellular insulating body to the surrounding environment. As the gaseous para-hydrogen passes through the porous cellular insulating body, it is contacted by the para-to-ortho-hydrogen catalyst particles uniformly distributed throughout the body and converted from para to ortho-hydrogen.

In addition to the thermal insulation and high temperature gradient provided by the low thermal conductivity of the porous cellular structure, the apparatus, body or element 10 is protected by the heat absorbed in the conversion of para-hydrogen from its liquid to gaseous state; as represented by its heat of vaporization, and is also protected by the endothermic reaction of para-hydrogen to ortho-hydrogen induced by the uniform distribution of finely divided para-to-ortho-hydrogen catalyst particles in the cell forming structure. The preferred para-to-ortho-hydrogen catalyst is particulate ferric oxide.

While FIG. 2 illustrates the nature of the porous cellular insulating body 11, it has not been provided with, because of its small scale, a showing of the uniform distribution of finely divided para-to-ortho-hydrogen catalyst or the liquid para-hydrogen in the multiplicity of fine cells.

Figure 3:
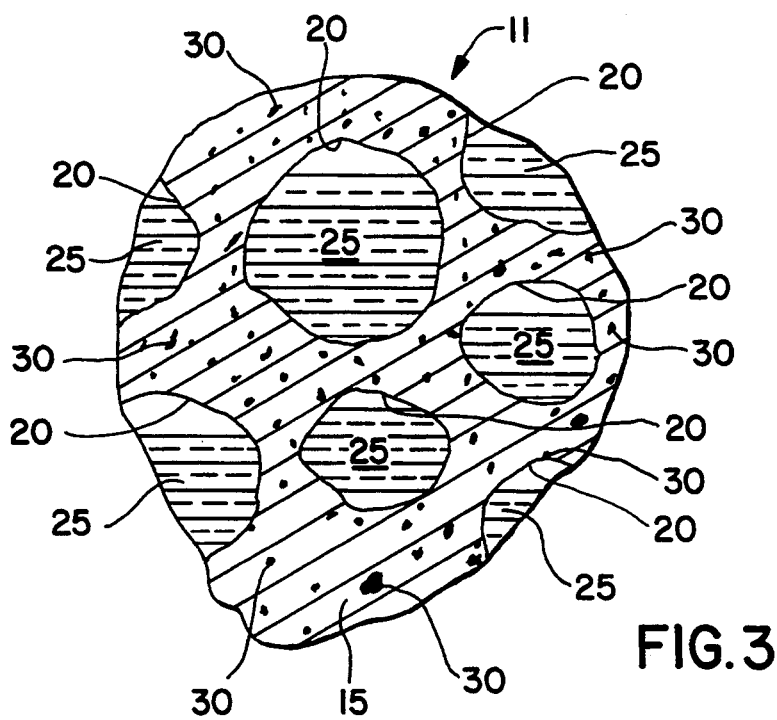
FIG. 3 is a further enlarged diagram of a portion of the multicellular structure of FIGS. 1 and 2 to illustrate the uniform distribution of catalyst in the cell forming structure and the liquid containing cells of the system of the invention.

FIG. 3 is an enlarged portion of the interior of the porous cellular insulating body 11 of FIGS. 1 and 2. As shown in FIG. 3, the body 11 comprises a foam-forming material 15 that forms uniform distribution of cells or voids 20 uniformly distributed throughout the body 11. The plurality of cells 20 are provided with liquid para-hydrogen 25, which is indicated in FIG. 3 by the alternating full and dashed lines. The liquid para-hydrogen is provided within the voids in a manner to be described below. In addition, as shown in FIG. 3, the foam-forming material 11 is provided with a uniform distribution of fine particles 30 of catalyst for the conversion of para-hydrogen to ortho-hydrogen. To avoid complication of FIG. 3, not all of the small particles of para-hydrogen catalysts have been provided with identifying numbers. As shown, however, in FIG. 3, many particles of para-hydrogen catalysts will lie closely adjacent the inside walls of the cells 20 and may be exposed to the liquid para-hydrogen.

As the body 11 is exposed to the heat of its surrounding environment, the foam-forming material 15 and liquid para-hydrogen 25 absorb heat and increase in temperature. The liquid para-hydrogen 25 changes from liquid to gaseous state in response to the absorbed heat and passes through the internal walls of the cells 20 and outwardly through the material 15 to escape to atmosphere. Since the para-hydrogen 25 is exposed to the para-to-ortho-hydrogen catalyst 30, it is converted by the catalyst to ortho-hydrogen and in the conversion absorbs heat in this endothermic reaction. Thus, heat is absorbed in the change of state of the para-hydrogen from liquid phase to gaseous phase by its latent heat vaporization and heat is absorbed by the endothermic catalytic conversion of para-hydrogen to ortho-hydrogen.

Because of the good thermal insulating properties of the foam-forming material 15, the cooling effect accompanying the conversion of liquid para-hydrogen to gaseous ortho-hydrogen can be maintained for periods in excess of an hour. For example, a cubic foam block having a density of about 20 pounds per cubic foot, with a thickness of six inches, corresponding to the thickness of the body 11 shown in FIG. 2, can keep the center region corresponding to the apparatus, body or element 10 of FIG. 2, at or below room temperature for several hours when exposed to a 1100° F. heat pulse having a duration of about one and one-third hours, if the voids or cells 20 formed therein are filled with triple point (13.8° C.) para-hydrogen.

The invention can thus provide substantially improved protection of apparatus, bodies and elements to high temperature transients. When a system of the invention is exposed to a high temperature environment, such as 1100° F. hydrogen, helium or combinations of either gas, the contained liquid para-hydrogen first turns to gas which then passes through the foam matrix intercepting heat coming into the foam by virtue of its hydrogen gas enthalpy. In addition, because of the distributed para-ortho-hydrogen catalyst, the heat of conversion of para to ortho-hydrogen is available for further refrigeration of the foam matrix as the gas increases in temperature. The heat of this endothermic conversion is approximately equivalent to the heat of vaporization of hydrogen and effectively increases the refrigerating capabilities of the para-hydrogen contained within the foam matrix. The invention is particularly valuable for high temperature insulation of systems in hypersonic vehicles such as the X-30 national aerospace plane which use hydrogen for fuel. The invention can be used to insulate the fuel tanks of the airplane by placing it in the walls of the fuel tank. It can be used for the protection of motors, pumps and electronics contained within the air frame or inside the fuel tanks of such airplane. The invention thus provides an insulation system which satisfies the lightweight passive operation requirements needed for such hypersonic vehicles.

In the system of the invention, as noted above, the finely divided para-to-ortho-hydrogen catalyst is preferably granulated ferric oxide, and the porous cellular insulating body is preferably formed from a silicious high temperature insulating foam.

Insulating systems of the invention may be provided by several methods. One such method can comprise forming a porous enclosure for the apparatus, body or element to be protected comprising a multiplicity of fine cells within a porous solid foam-like material, including uniform distribution of finely divided granulated catalyst for para to ortho-hydrogen conversion, immersing the porous enclosure into a bath of liquid para-hydrogen to fill the multiplicity of fine cells of the porous enclosure with liquid para-hydrogen, and placing the apparatus, body or element to be protected within the para-hydrogen filled porous enclosure.

In such enclosure, the body is protected from heat entering the porous enclosure by the conversion of liquid para-hydrogen from liquid state to gaseous state and from para to ortho-hydrogen in the presence of the granulated catalyst. The porous enclosure can be formed by providing a mold to form a porous enclosure; providing a foam-forming resin liquid, mixing finely granulated para to ortho catalyst, such as particulate ferric oxide into the foam-forming resin liquid to provide a uniform mixture of ferric oxide particles suspended in the foam-forming liquid, adding a catalyst for the foam-forming reaction to the mixture, and pouring the catalyzed foam-forming liquid and uniform mixture of ferric oxide particles into the mold where the foam-forming liquid reacts in response to the catalyst, forms an expanding foam in the form of the mold, including uniform distribution of ferric oxide particles.

While I have described what I believe to be the best mode of my invention, my invention can take many forms. Accordingly, it should be understood that the invention is only limited by the scope of the following claims and the prior art.

I claim:

1. A thermal insulating material, comprising:
a porous, cellular insulating body including a uniform distribution of finely divided para to ortho-hydrogen catalyst in a cell forming structure and further including liquid para-hydrogen disposed within the cells of said insulating body.

2. The material of claim 1 wherein the finely divided para to ortho-hydrogen catalyst is granulated ferric oxide.

3. The method of claim 1 wherein the porous, cellular insulating body is formed from a silicious high temperature insulating foam.

4. The material of claim 1 wherein the cells of the porous, cellular insulating body comprise 88% of the volume of said body.

5. A method of reducing a transfer of heat to a body, comprising:

forming a porous enclosure for the body, said enclosure comprising a multiplicity of fine cells formed by a porous solid foam-like material including a uniform distribution of finely divided granulated catalyst for converting para-hydrogen to ortho-hydrogen;

immersing the porous enclosure into a bath of liquid para-hydrogen for a time sufficient to fill the multiplicity of fine cells of the porous enclosure with liquid para-hydrogen; and placing the body to be protected within the porous enclosure.

6. The method of claim 5 wherein the step of forming the porous enclosure includes the steps of:

providing a form for the porous enclosure;

providing a foam-forming resin liquid;

mixing finely divided para-to-ortho-catalyst into the foam-forming resin liquid to provide a uniform mixture of para-to-ortho-hydrogen catalyst particles suspended in the foam-forming resin liquid;

adding a catalyst to the mixture of foam-forming resin liquid and para-to-ortho-hydrogen particles, said catalyst initiating a reaction to convert the foam-forming resin liquid to a porous solid comprising a multiplicity of fine cells;

pouring the mixture of the catalyzed foam-forming resin liquid and para-to-ortho-hydrogen catalyst particles into the form and allowing the reaction of the foam-forming resin liquid to fill the form and form a solid but porous cellular structure including uniform distribution of the para-to-ortho-hydrogen catalyst.

7. The method of claim 5 wherein the step of forming a porous enclosure includes the steps of:

providing a mold to form a porous enclosure;

providing a foam-forming resin liquid;

mixing finely divided ferric oxide into the foam-forming resin liquid to provide a uniform mixture of ferric oxide particles suspended in the foam-forming liquid;

adding a catalyst to the mixture of foam-forming liquid and ferric oxide particles;

placing the body to be protected into the mold and pouring the catalyzed uniform mixture of foam-forming resin liquid and ferric oxide particles into the mold; allowing the foam-forming resin liquid to expand in reaction to the catalyst to fill the mold and to harden and form a solid, but porous cellular structure around the body, said cellular structure including a uniform distribution of ferric oxide particles surrounding the body.

8. The method of claim 5 wherein the foam-forming resin liquid is a silicious high temperature insulating foam material.

9. The method of claim 5 wherein the para-to-ortho-hydrogen catalyst is granulated ferric oxide.

10. The method of claim 6 wherein the foam-forming resin liquid, in reaction to the catalyst, forms the porous enclosure having cells which comprise about 88% of the volume of the porous enclosure.

11. A transient material for insulating an element at an extraordinary high temperature, comprising:

a porous insulating body comprising a multiplicity of fine cells; and a thermally absorptive liquid defined by para-hydrogen within the fine cells of said insulating body, said thermally absorptive liquid having a boiling point less than the extraordinary high temperature, said thermally absorptive liquid providing a series of irreversible endothermic reactions to absorb heat and thereby reduce the transfer of heat to said element, including a first irreversible endothermic reaction in the presence of the extraordinary high temperature wherein the para-hydrogen endothermically vaporizes from a liquid phase to a gaseous phase, thereby reducing the transfer of heat to said element, and a second irreversible endothermic reaction wherein the gaseous para-hydrogen endothermically converts to ortho-hydrogen in the presence of a catalyst uniformly distributed throughout said insulating body, thereby further reducing the transfer of heat to said element.

12. The transient insulating material as in claim 11 wherein said para-to-ortho-hydrogen catalyst comprises particulate ferric oxide.

* * * * *